April 18, 1944.  F. F. KISHLINE  2,346,972
VIBRATION DAMPENER
Filed June 12, 1941
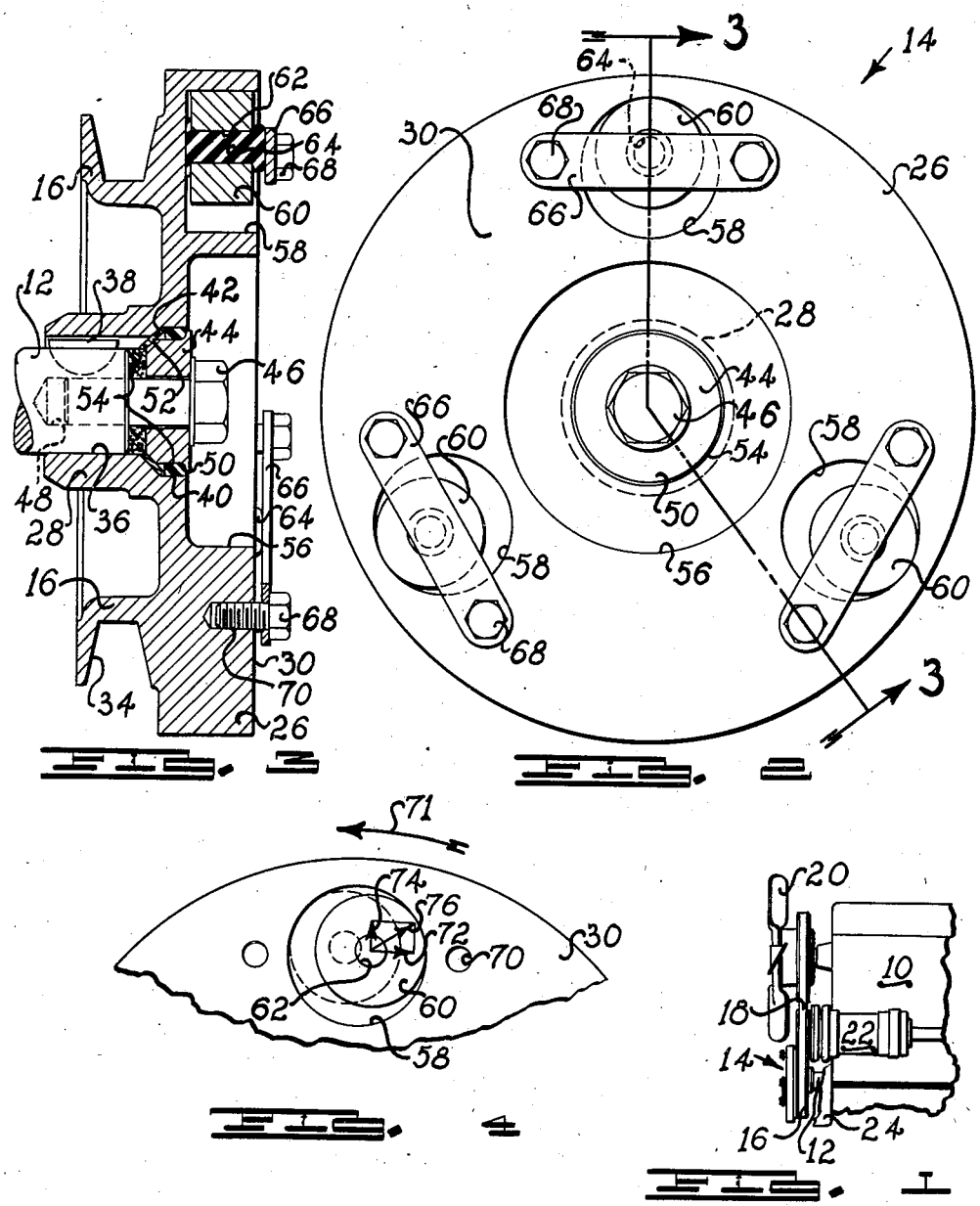
INVENTOR.
FLOYD F. KISHLINE
BY Carl J. Barbee
his attorney Patented Apr. 18, 1944

2,346,972

UNITED STATES PATENT OFFICE 2,346,972

VIBRATION DAMPENER

Floyd F. Kishline, Kenosha, Wis., assignor to Nash Kelvinator Corporation, Kenosha, Wis., a corporation of Maryland Application June 12, 1941, Serial No. 397,671

4 Claims. (Cl. 74—574)

This invention relates to dampeners and has particular reference to means for dampening the torsional vibrations in the crank shaft of an internal combustion motor.

The crank shaft of an automotive motor is subjected to a series of impulses due to the action of the various connecting rods applying forces thereto. When these impulses are applied to the crank shaft in the same phase as the natural frequency of vibration of the crank shaft, undesirable vibrations are set up and certain mechanisms have been employed to dampen or retard these vibrations, which mechanisms have taken the form of vibration dampeners which are usually attached to the forward end of the crank shaft, which is the end of the crank shaft opposite the main flywheel of the motor. These vibration dampeners have taken the form of an inertia member which is free to rotate slightly relative to the crank shaft in order to absorb a portion of the energy added to the crank shaft by the power impulses. These inertia members have been connected to the crank shaft through rubber connections and through various friction connections which permit this partial rotation and which will return the energy from the inertia member to the crank shaft at time intervals out of phase with the natural frequency of the crank shaft. It has also been suggested to mount eccentric inertia members on crank shafts which are spring balanced on the crank shaft so that relative movement between the inertia member and the crank shaft is restrained and retarded by spring pressure.

This invention provides means for mounting an inertia member on a crank shaft at a point eccentrically disposed with respect to the axis of rotation of the crank shaft. The inertia member is relatively free to move both radially and rotatively with respect to the crank shaft and to receive energy from and impart energy to the crank shaft to produce the desired dampening effect. More particularly the invention provides a series of inertia members which are symmetrically disposed about the axis of the crank shaft so that the inertia members do not statically unbalance the crank shaft.

The invention has as one of its objects the provision of a vibration dampener which will have no parts which are subject to wear and which may be easily assembled on the crank shaft.

It is another object of this invention to provide a vibration dampener which will not statically unbalance the crank shaft.

It is another object of this invention to provide means for retaining relatively free inertia members in a vibration dampener at points radially offset from the axis of rotation of the dampener at all times.

It is another object of this invention to provide inertia members in a vibration dampener which are mounted in such a manner that the centrifugal and inertia forces set up by angular acceleration of the crank shaft cause the inertia members to shift their position relative to the vibration dampener to absorb vibrations set up in the crank shaft.

Other objects and advantages of this invention will be apparent from a consideration of the following description and claims and the attached drawing, of which there is one sheet, and in which—

Figure 1 represents a side elevation of the front end of an internal combustion motor showing a vibration dampener in place thereon;

Figure 2 represents a front elevation of the vibration dampener shown in Figure 1;

Figure 3 represents a sectional view taken along a plane indicated by the line 3—3 in Figure 2 and looking in the direction of the arrows; and Figure 4 represents a front elevation of a portion of the vibration dampener and illustrates the various positions taken by the inertia member during rotation of the crank shaft together with the forces operating on the inertia member.

Figure 1 illustrates an internal combustion motor 10 having a crank shaft, the forward end of which projects forwardly of the motor at 12 and to which is attached a vibration dampener generally indicated at 14. The vibration dampener carries the pulley section 16 arranged to drive a belt 18 which in turn drives the usual fan 20 and generator 22. The forward end of the crank shaft may be enclosed by and extend through a cover plate, a portion of which is shown at 24.

More specifically, the vibration dampener 14 consists of a wheel 26 preferably formed of cast iron so that it may act as an auxiliary flywheel. The wheel 26 has a hub portion 28 and a generally flat disc shaped portion 30. The back side of the disc portion 30 carries an annular pulley portion 16 which defines the V groove 34 (see Figure 3) within which the fan belt 18 is positioned. The hub 28 is provided with a central bore 36 which receives the end of the crank shaft 12 and a key 38 which secures the wheel 26 against rotation relative to the crank shaft. The forward end of the bore 36 is enlarged as at 40 forming a beveled face at 42. The wheel is retained on the crank shaft by means of a washer 44 and cap screw 46 which extends through the washer and is threaded into a hole tapped in the forward end of the crank shaft as at 48. The washer 44 is provided with an annular flange 50 and a tapered face 52 which is arranged to bear against the beveled shoulder 42 on the wheel. Suitable sealing gaskets 54 are provided between the washer 44 and the walls of the bore 40 to prevent oil from the motor from leaking out along the end of the crank shaft 12.

The forward face of the disc portion 30 defines a central pocket 56 within which the cap screw 46 and washer 44 are recessed and a series of pockets 58 which are equally spaced around the disc 30 and radially offset from the center of the crank shaft.

In the particular embodiment of the invention illustrated, the pockets 58 have generally circular, cylindrical surfaces but are not necessarily limited to this shape. Positioned in each of the pockets 58 is a cylindrical inertia member 60 which is preferably made of steel or some other relatively hard and heavy material. The inertia members 60 have a central aperture 62 through which extend pegs 64 of rubber or some similar deformable material. The pegs 64 extend beyond the faces of the inertia member 60 and are lightly compressed between the back faces of the pockets 58 and tie bars 66. The ends of the tie bars are secured to the disc portion 30 by means of cap screws 68 threaded into holes 70 tapped in the disc portion 30 on each side of each aperture 58.

When the crank shaft is rotating as when the motor is operating, the inertia members 60 will be urged against the outer edge of the pockets 58 by the centrifugal force and will assume the positions shown in Figures 2 and 3. If the speed of the crank shaft were to remain perfectly constant, the inertia members would remain in this position at all times. The tie bars 66 and rubber pegs 64 prevent the inertia members from falling out of the pockets and from falling radially inwardly of the pockets 58 when the motor is stopped, thus preventing any rattling noise when the motor is started. However, as was explained before, the crank shaft speed does not remain constant but is subjected to a series of impulses tending to accelerate and decelerate the rotative speed of the crank shaft and wheel 26.

The action of the inertia members during acceleration and deceleration of the crank shaft and disc member 30 is most clearly illustrated in Figure 4 in which one of the inertia members 60 is shown to have moved along the surface of the pocket 58. Assuming the acceleration of the disc member 30 to be in the direction indicated by the arrow 71, the energy of the mass of the inertia member 60 will exert a force to the right indicated by the vector 72. The centrifugal force acting upon the inertia member 60 will continue to act radially outwardly of the vibration dampener as indicated by the vector 74. The resultant of these two vectors is indicated at 76 and indicates that the inertia member 60 will exert a force against the side wall of the pocket 58 opposing the forces tending to accelerate the vibration dampener and consequently tending to reduce the acceleration.

Attention is called to the fact that the inertia member 60 has been moved radially inwardly against the action of the centrifugal force and to the right against its inertia force. The inertia member has thus stored up energy which has been removed from the vibration dampener and crank shaft. As the acceleration of the crank shaft and vibration dampener is reduced to zero, the centrifugal force acting on the inertia member returns the inertia member to the outside of the pocket 58 as shown in Figure 2. While the exact movement of the inertia members cannot be watched due to the high speed rotation of the wheel on which they are carried, it is believed that the energy stored in the inertia member as just explained will cause the inertia member to overrun its center position and move slightly to the left as indicated by the dotted lines in Figure 4 and thus add energy to the crank shaft and vibration dampener. The inertia members 60 are believed to oscillate between the two positions shown in Figure 4 alternately absorbing and returning energy to the vibration dampener. Since this oscillation will be out of phase with the natural frequency of oscillation of the crank shaft and vibration dampener, it will act to counteract or smooth over the vibration of the crank shaft which is the result desired to be accomplished. The amplitude of movement of the inertia member, which is shown in an exaggerated degree in Figure 4, is so small and its frequency so great that the rubber peg 64 does not materially hinder the above described movement. The rubber peg will, however, act to dampen the oscillations of the inertia member and the degree of this dampening effect may be adjusted by changing the tightness of the screws 70.

Attention is called to the fact that the only wearing surface in the vibration dampener is between the side walls of the pockets 58 and the inertia member 60 which are formed of hard, wear resisting metal so that the vibration dampener as a whole is not apt to wear out. The rubber pegs 64, in addition to their dampening effect described above, serve only to retain the inertia members in position when the motor is stopped and to prevent the inertia members from falling out of the pockets. The pegs are flexible enough to permit the inertia members to oscillate in the pockets 58 without overly stressing the pegs. It is further to be noted that the vibration dampener will not statically unbalance the crank shaft and will not run eccentrically with respect to the crank shaft.

In connection with the static balance of the crank shaft, it will be noted that while the symmetrical spacing of the inertia members provides a statically balanced crank shaft assembly, this spacing of the inertia members and balancing of the crank shaft is not a necessary feature to the vibration dampening characteristics of the inertia members. The inertia members could be unequally spaced about the axis of the crank shaft with the proper static balance being obtained by varying the size and weight of the inertia members. It is conceivable that a single inertia member, statically balanced by proper fixed masses on the opposite side of the crank shaft, might be more desirable in some motors than the particular arrangement shown. It is further conceivable that the inertia members might be mounted directly on the crank shaft rather than on a separate wheel attached to the crank shaft.

While I have described my invention in some detail, I intend this description to be an example only and not as a limitation of my invention, to which I make the following claims:

1. A vibration dampener comprising a wheel having a portion defining a series of cylindrical pockets equally spaced along a circle about the axis of said wheel, cylindrical inertia weights positioned in said pockets and defining apertures along their longitudinal axis, the diameter of said inertia weights being smaller than the diameter of said pockets, deformable members positioned in said apertures and extending beyond the faces of said weights, and retaining means bridging said pockets and contacting said deformable members to compress the same between said retaining means and the bottoms of said pockets.

2. A torsional vibration dampener for a rotating part comprising a member secured to said part for rotation therewith, said member defining a recess positioned eccentrically with respect to the axis of rotation of said member and having a surface containing elements extending parallel to said axis of rotation, said surface being concave with respect to said axis, an inertia weight having a cylindrical surface and defining an aperture therethrough concentric with respect to said surface, said weight being positioned in said recess and arranged to roll upon said surface, a rubber plug positioned in said aperture and extending beyond each face of said weight, and a strap secured to said member and extending across said recess and one end of said rubber plug whereby said plug is compressed slightly between the bottom of said recess and said strap.

3. A torsional vibration dampener for a rotating part comprising a member secured to said part for rotation therewith, said member defining a cylindrical recess positioned eccentrically with respect to the axis of rotation of said member, a cylindrical inertia weight apertured along the primary axis thereof, said weight being positioned in said recess and arranged to roll therein, a plug of compressible material positioned in said aperture and extending beyond each face of the weight, heads formed on the extending ends of said plug, and a strap secured to said member and spanning said recess and one end of said plug, said strap extending centrally across said recess and being of a width at least as great as the difference in diameter between the weight and the recess to insure registration of said plug end with said strap at all times.

4. A torsional vibration dampener for a rotating part comprising a member secured to said part for rotation therewith, said member defining a cylindrical recess positioned eccentrically with respect to the axis of rotation of said member, a cylindrical inertia weight smaller in diameter than said recess and apertured along the primary axis thereof, said weight being positioned in said recess and arranged to roll therein, said weight being shorter along the primary axis than said cylindrical recess, means spanning said recess to retain said weight therein, and means attached to said weight and extending therebeyond into contact with said member and said spanning means for damping chance oscillations of said weight.

FLOYD F. KISHLINE.